United States Patent
Wren (10) Patent No.: US 7,302,369 B2
(45) Date of Patent: Nov. 27, 2007

(54) TRAFFIC AND GEOMETRY MODELING WITH SENSOR NETWORKS

(75) Inventor: Christopher R. Wren, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 625 days.

(21) Appl. No.: 10/684,116

(22) Filed: Oct. 10, 2003

(65) Prior Publication Data

US 2005/0080601 A1    Apr. 14, 2005

(51) Int. Cl.
*G06F 7/60* (2006.01)
*G06F 17/10* (2006.01)
*G06G 7/76* (2006.01)

(52) U.S. Cl. .......................... 703/2; 701/117
(58) Field of Classification Search ............ 703/2; 701/117
See application file for complete search history.

(56) References Cited

U.S. PATENT DOCUMENTS 6,587,781 B2    7/2003  Feldman et al. .......... 701/117
7,136,842 B2 *  11/2006 Pirim ...................... 706/45

OTHER PUBLICATIONS

Christopher R. Wren and Srinivasa G. Rao. Self-configuring, light-weight sensor networks for ubiquitous computing. Fifth International Conference on Ubiquitous Computing: Adjunct Proceedings, Oct. 2003 also MERL Technical Report TR2003-24. pp. 1-10.*
C. Stauffer and W.E.L. Grimson, Learning Patterns of Activity Using Real Time Tracking, IEEE Trans. Pattern Analysis and Machine Intelligence, Aug. 2000, pp. 747-757.*
L. Lee, R. Romano, and G. Stein. Monitoring activities from multiple video streams: Establishing a common coordinate frame. IEEE Transactions on Pattern Recognition andMachine Intelligence, 22(8), 2000, pp. 758-767.*

(Continued)

*Primary Examiner*—Paul Rodriguez
*Assistant Examiner*—Juan Carlos Ochoa
(74) *Attorney, Agent, or Firm*—Dirk Brinkman; Clifton D. Mueller; Gene V. Vinokur

(57) ABSTRACT

A method models movement of users in an environment including sensors connected in a network. Events due to movement of the users are detected at the sensors and each event is labeled according to a particular sensor and time of the event. The events for each sensor are summed into a corresponding histogram time interval bin. A plurality of co-occurrence matrices are generated from the histograms according to $$C_{i,j,\delta} = \sum_{t=0}^{T} H_{i,t} H_{j,t+\delta},$$

where i and j represent each possible pair of sensors, δ represent time-off-sets, T is a total time for the detecting, t represents a particular time, and H represents the histogram time interval bins. The co-occurrence matrices can be used to determine a geometry of the network, and for predicting future activities signaled by terminating events.

21 Claims, 10 Drawing Sheets

OTHER PUBLICATIONS

Yaron Caspi and Michal Irani. Alignment of non-overlapping sequences. In ICCV. IEEE, 2001, pp. 1-8.*

Nissanka, et al., "The cricket location-support system," Proc. of the Sixth Annual ACM International Conference on Mobile Computing and Networking, Aug. 2000.

W.E.L. Grimson, et al., "Using adaptive tracking to classify and monitor activities in a site," IEEE CVPR, Jun. 1998.

Johnson, et al. "Learning the distribution of object trajectories for event recognition," Image and Vision Computing, 14(8), 1996.

Kidd, et al., "The aware home: A living laboratory for ubiquitous computing research," Proceedings of Second International Workshop on Cooperative Buildings, Oct. 1999.

LaMarcal, et al., "Plantcare: An investigation in practical ubiquitous systems," Fourth International Conference on Ubiquitous Computing, 2002.

Steyvers, "Multidimensional Scaling," *Encyclopedia of Cognitive Science*, Macmillan Reference Ltd. 2002.

* cited by examiner

TRAFFIC AND GEOMETRY MODELING WITH SENSOR NETWORKS

FIELD OF THE INVENTION

The invention relates generally to sensor networks, and in particular to modeling traffic of objects with sensor networks and modeling geometries of sensor networks.

BACKGROUND OF THE INVENTION

Users of an environment, be it enclosed buildings, open spaces, or urban and rural roads, dynamically generate patterns of movement as the users move around in the environment. Users can be people, vehicles, or other mobile objects.

However, most automated systems for such environments, such as heating, cooling, lighting, elevator, security, traffic control systems, do not consider patterns of movement to dynamically adjust their operation for the users, e.g., building occupants, vehicles, or other mobile objects.

At most, elevator systems may have a pre-programmed schedule that favors up-traffic in mornings, and down-traffic in the late afternoons. Similarly, HVAC systems may have different pre-programmed day-time and night-time operational settings. Traffic lights can also be preprogrammed. There are some devices, such as automated appliances that include sensors that respond to local movement. However, most systems are generally insensitive to large scale patterns of movement in the environment.

It is desired to place a sensor network in an environment so that patterns of movement, i.e. traffic flow, of users in the environment can be determined. In addition, it is desired to predict future activities of the users based on known patterns of users.

Sensor networks, static and ad-hoc, are well known. It is preferred to use an ad-hoc sensor network. This makes it easy to relocate sensors as configurations of the environment, and patterns of usage change over time. Thus, the sensors can be adapted to current or future patterns of usage.

However, in either case, to make data acquired by the sensors useful for location specific analysis, it is necessary to determine a geometry of the sensors with respect to the environment. The geometry defines the spatial relationship between the sensors. It is desired to do this automatically and passively with just the sensors themselves.

Nissanka, et al., "The cricket location-support system," Proc. of the Sixth Annual ACM International Conference on Mobile Computing and Networking, August 2000, describe a sensor network that times ultrasonic signals to determine locations of sensors. That is an active system that uses specialized components and processing. Other similar techniques based on RF signals are described by LaMarcal, et al., "Plantcare: An investigation in practical ubiquitous systems," Fourth International Conference on Ubiquitous Computing, 2002, and Sahinoglu, "Location Estimation in Partially Synchronized Networks, U.S. patent application Ser. No. 09/649,759, filed on Aug. 26, 2003. Those systems are relatively complex. For many applications, the resolution of the geometry of the sensors in the network does not warrant the cost and complexity involved with the prior art solutions.

Tracking data have been used in the prior art to determine patterns of movement, see W. E. L. Grimson, et al., "Using adaptive tracking to classify and monitor activities in a site," IEEE CVPR, June 1998, and Johnson, et al. "Learning the distribution of object trajectories for event recognition," Image and Vision Computing, 14(8), 1996. Those methods require the tracking and identification of specific objects in an environment over time.

The Aware Home project at Georgia Institute of Technology follows a similar idiom of attempting to understand behavior from relatively low-fidelity models, see Kidd, et al., "The aware home: A living laboratory for ubiquitous computing research," Proceedings of Second International Workshop on Cooperative Buildings, October 1999. That work also requires tracking data of particular individual objects or users in order to determine pattern information in the environment.

In the prior art, event prediction in an environment has also required tracking data for particular objects, see U.S. Pat. No. 6,587,781, issued to Feldman, et al., on Jul. 1, 2003. That method requires voluminous traffic data acquired from a variety of sources be prioritized, filtered and controlled before any processing step can be applied to the data, and a geometry of the environment must be known.

It is desired to model traffic flow with sensor networks. It is desired to do this passively and without having to identify events with specific objects. It is also desired to predict future activities based on the traffic flow. Furthermore, it is desired to determine geometries of sensor networks in a similar manner.

SUMMARY OF THE INVENTION

The method according to the invention models movement of users in an environment including sensors connected in a network. Events due to movement of the users are detected at the sensors and each event is labeled according to a particular sensor and time of the event. The events for each sensor are summed into a corresponding histogram time interval bin. A plurality of co-occurrence matrices are generated from the histograms according to $$C_{i,j,\delta} = \sum_{t=0}^{T} H_{i,t} H_{j,t+\delta},$$

where i and j represent each possible pair of sensors, $\delta$ represent time-off-sets, T is a total time for the detecting, t represents a particular time, and H represents the histogram time interval bins.

For each possible pair of sensors, a distance between the pair of sensors is determined and the distances are mapped to a geometry of the sensors.

The co-occurrence matrices can be used to determine a geometry of the network, and for predicting future activities signaled by terminating events.

DETAILED DESCRIPTION OF THE PREFERRED EMBODIMENTS

Traffic Modeling

System Structure

Figure 1A:
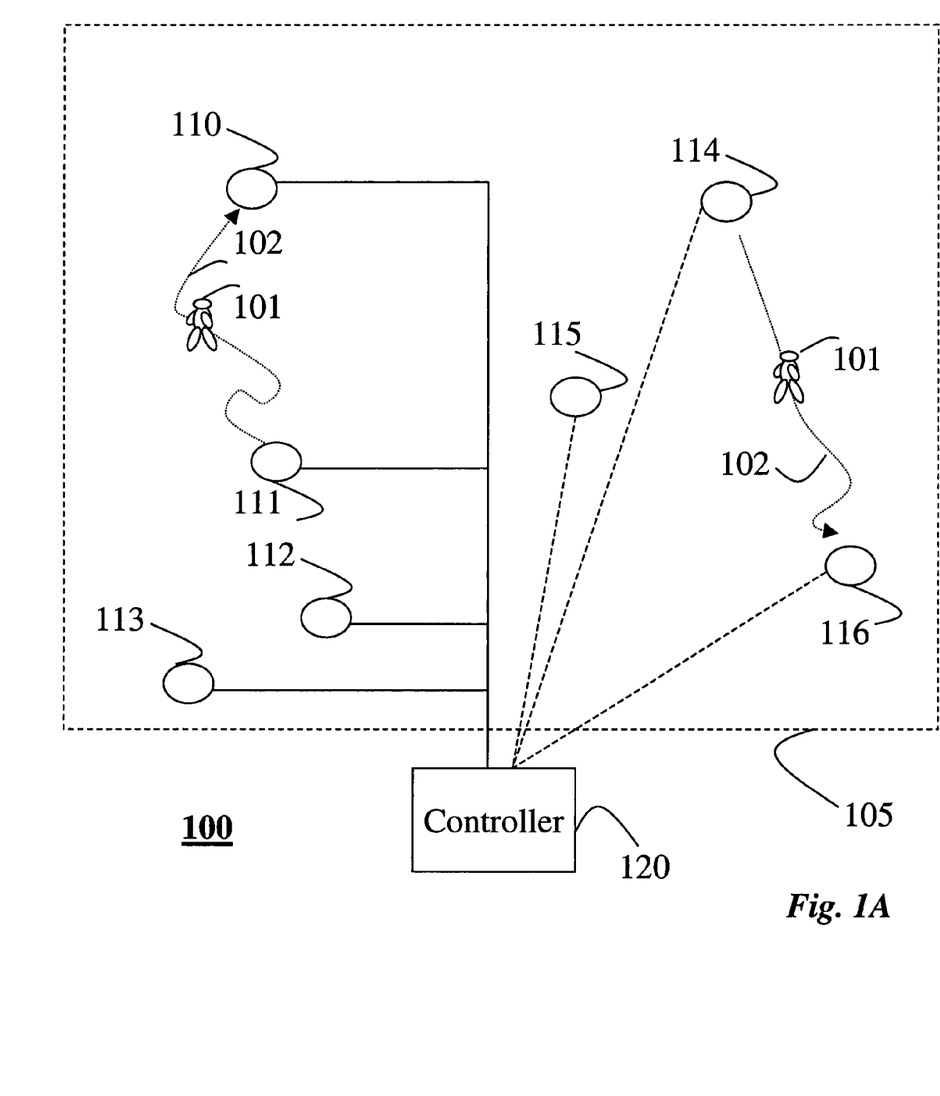
FIG. 1A is a block diagram of a sensor network that can use the invention.

FIG. 1A shows a system 100 for modeling traffic patterns in sensor networks, and for modeling the geometries of sensor networks according to the invention. The system 100 includes multiple sensors 110-116 in an environment 105. In an example application, the environment 105 is an office building, and the sensors are located in traffic areas such as hallways, lobbies, elevator waiting areas, break rooms, door ways, etc.

Figure 1B:
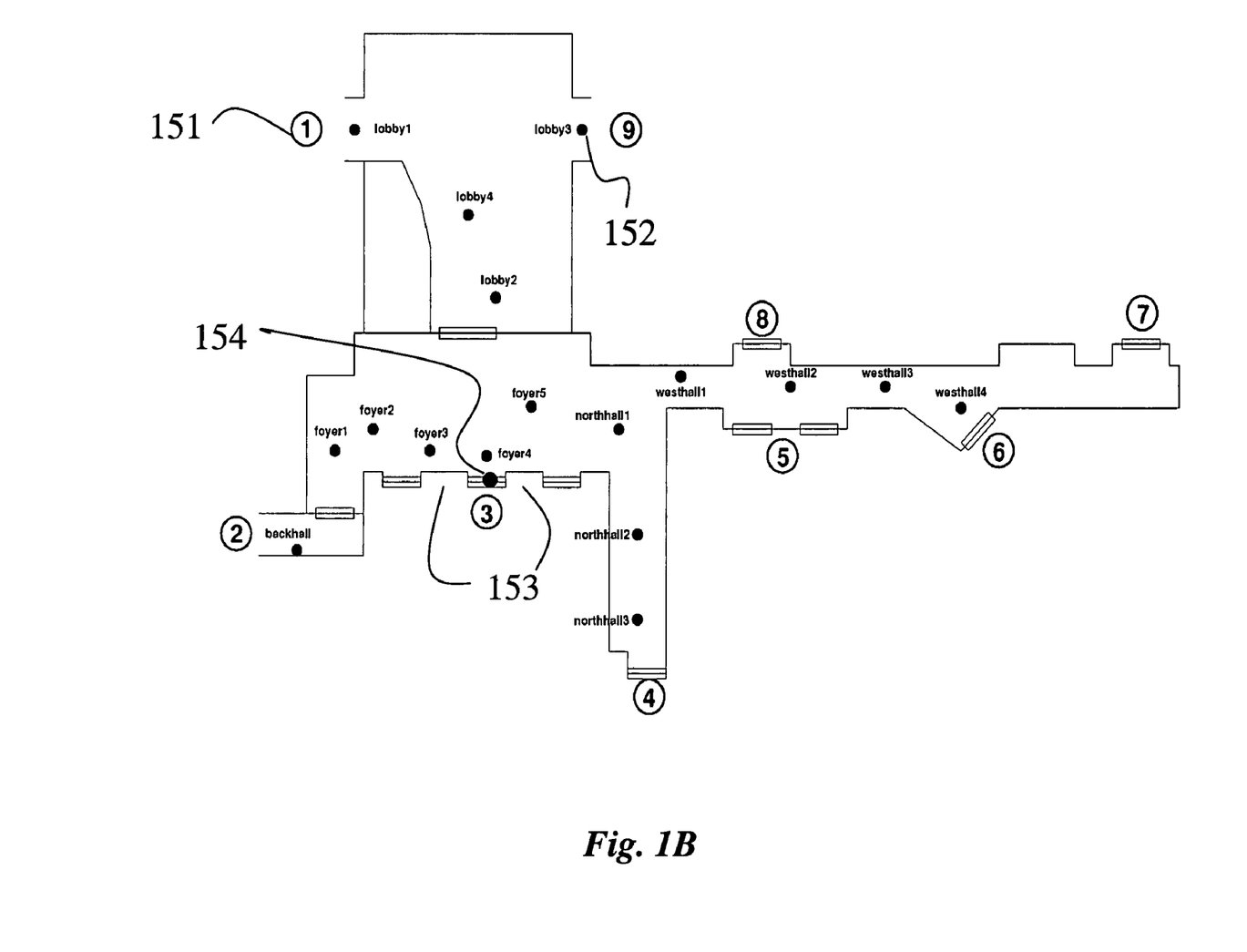
FIG. 1B is a floor plan of a building with a sensor network that can use the invention.

FIG. 2B shows a floor plan of a building. Numbered circles indicate doorways 151, and filled circles indicate sensors 152. The doorways 153 labeled 3 are elevator doors. The sensor 154 is an elevator hall call button.

The sensors 110-116 are connected to a controller 120. The connections can be wired or wireless, e.g., a IEEE-1394 network.

In a preferred embodiment, the sensors have an extremely low resolution. For example, the sensors can only detect and report events using a single bit.

Thus, the event is simply a Boolean event. Auxiliary information about direction of motion, velocity and identity of the detected user is not required. Also, there is no requirement to track users from one sensor to another sensor.

Example sensing modalities include infra-red, thermal, ultrasonic, light, radar, sonar, microwave, and pressure. Alternatively, the sensors can be simple electrical on-off switches. For example, turning on a light switch, pressing an elevator button, turning on an appliance can be a sensed event and indicative of a user in the environment near the sensor.

The sensors are oriented in a manner that enables the sensor to detect 'events' occurring within a range of the sensor. For example, the sensors are mounted in a ceiling and are aligned with a longitudinal axis of a hallway.

As a characteristic, the sensors are low resolution, e.g., logical 0 indicates no event, and logical 1 indicates a detected event. The sensors are globally distributed in the environment in an ad-hoc arbitrary pattern. The ranges of the sensors do not need to overlap. The range of the sensors can vary. The modality used to detect events in the environment can also vary.

The controller 120 includes a processor, memory, I/O interfaces and peripheral devices coupled to each other. The processor executes operating system and application programs that implement a geometry defining method according to the invention, as described in greater detail below with reference to FIG. 2.

System Operation

The operation of the system 100 requires that users 101 move 102 within the environment 105. The users can be people, vehicles, or other mobile objects. As the users move, the various sensors are activated, and 'events' are detected at various times when the users approach the sensors.

The time off-sets between the events are used to estimate distances on the presumption that for a particular environment users move at a substantially consistent velocity. Thus, the geometry computed from the estimated distances is relatively accurate up to scale. However, it should be understood that the system does not require identification and tracking of individual users, and events detected by the system are not associated with any particular user.

Figure 2:
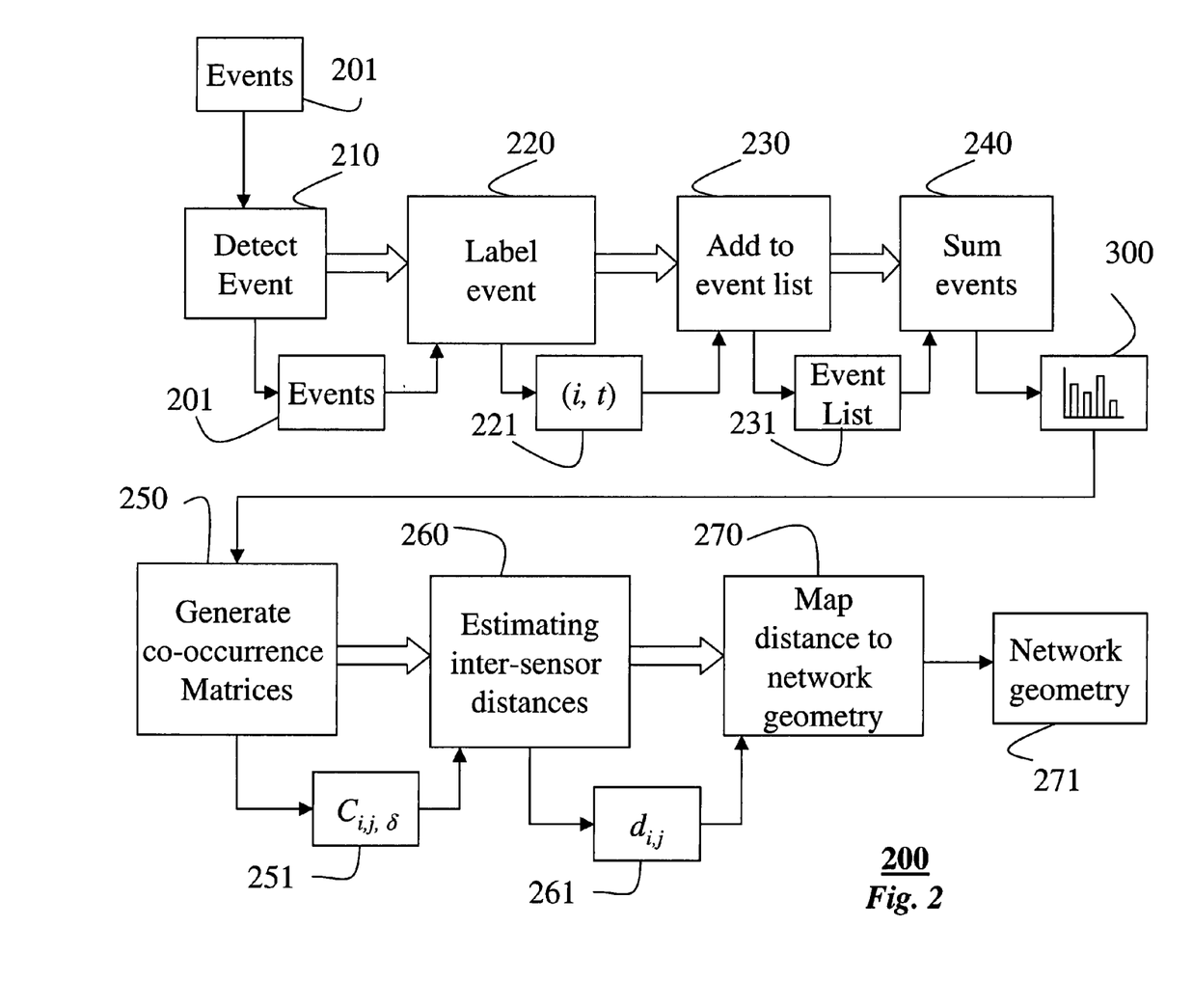
FIG. 2 is a flow diagram of the method for modeling sensor network geometries according to the invention.

FIG. 2 shows a method 200 for automatically modeling based on events detected by the sensor network 100. Events 201 are detected 210 in the environment 105 by the sensors. Each event is labeled 220 according to the detecting sensor i, and time t of the event. The labeled event 221 is added 230 to list 231 of detected events. The event list in a form of E(i, t)={0,1}.

$$E_{i,t} = \{0, 1\} \quad (1)$$

A particular entry in the event list 231 is true (1) if and only if a motion event is detected by the $i^{th}$ sensor at time t. It should be noted that the events are Boolean, and indicate merely the presence of some kind of motion anywhere within range of the sensor with no indication of the number of users, identities of the users, and direction and velocity of the motion, or any other secondary information.

Figure 3:
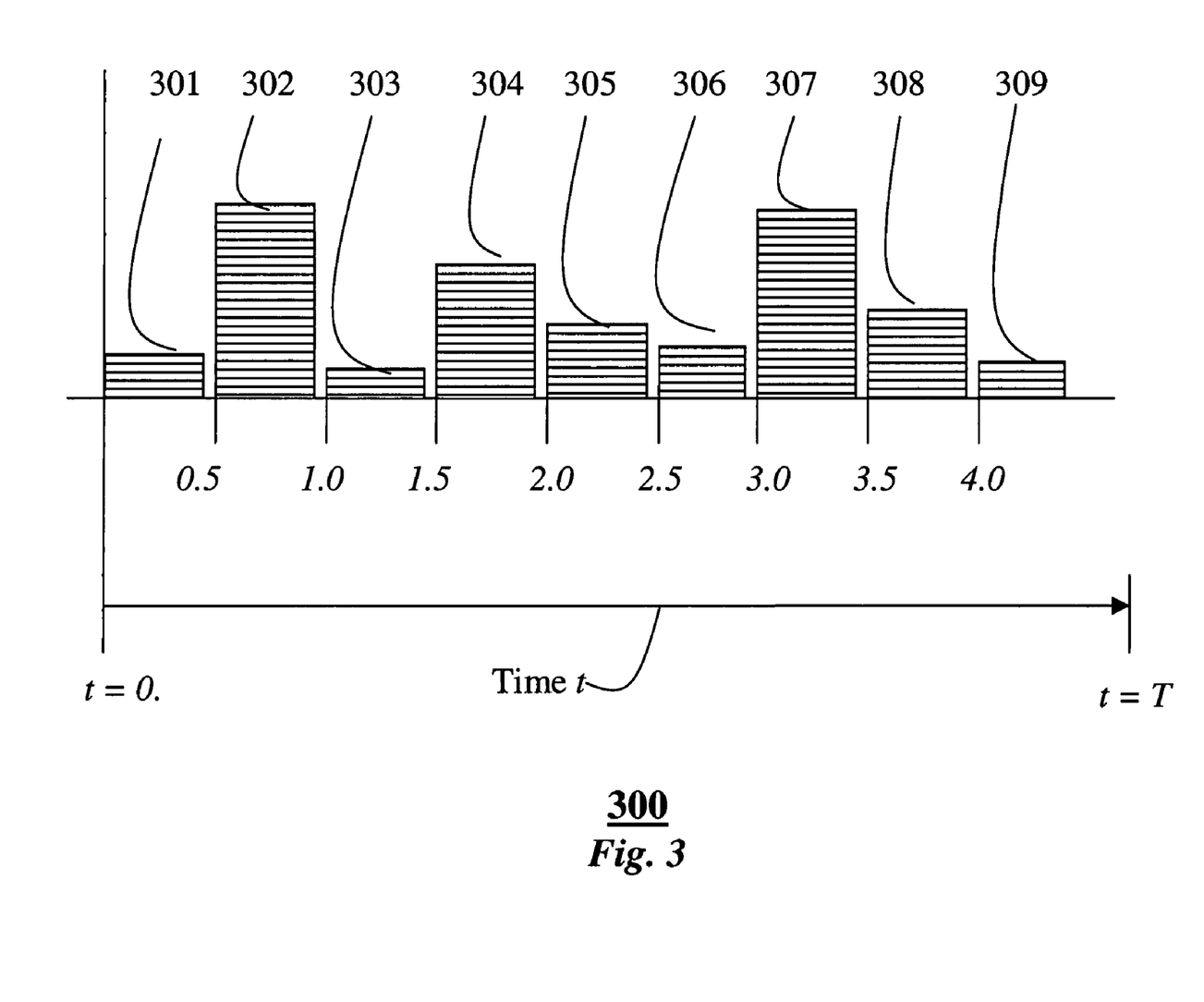
FIG. 3 is a histogram of detected events over time.

Labeled events in the list are summed 240 into a histogram 300 by sensor for predetermine time intervals 'bins'. The histograms 300 are used to construct 250 co-occurrence matrices $C_{i,j,\delta}$ 251, as described below, where i and j are two sensors, and δ is a time-offset between two events at sensor i and sensor j. The co-occurrence matrix is the basic model according to the invention for the detected events. The basic model can be used for a number of different applications.

Modeling Network Geometry

In one application the model is used to determine a geometry of the network. The geometry defines the spatial relationship between the sensors.

Inter-sensor distances $d_{ij}$ 261 are estimated 260 from the co-occurrence matrices 251. The distances are estimated from the time-offsets, under the assumption that movement within the environment, over a large time period, is substantially consistent. The distances 261 are then mapped 270 to a geometry 271 of the network of sensors.

FIG. 3 shows an example histogram 300. Each bin 301-309 represents a sum of all events detected by a particular sensor i during a 0.5 second time interval. An event histogram entry $H_{i,t}$, is a total number of detected events from sensor i in time interval bin t.

Figure 4:
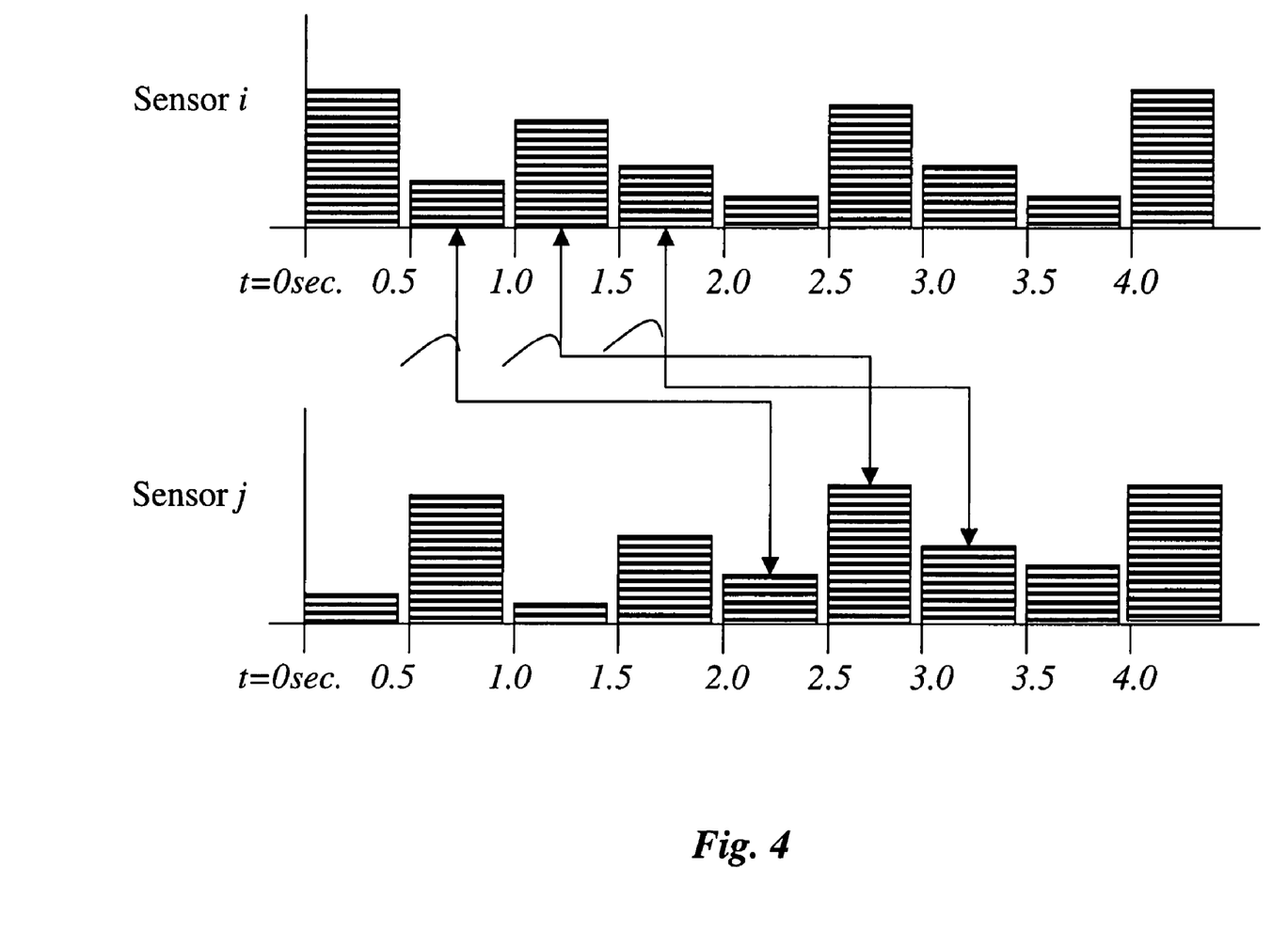
FIG. 4 illustrates a comparison of sensor histograms at a time offset.

The individual histogram entries are used to construct the co-occurrence matrices 251 by performing pair-wise comparisons of sensors i and j over a range of time offset δ according to $$C_{i,j,\delta} = \sum_{t=0}^{T} H_{i,t} H_{j,t+\delta},$$

where i and j are sensors being compared, and δ is the offset, as shown in FIG. 4 for a 1.5 second offset.

Figure 5:
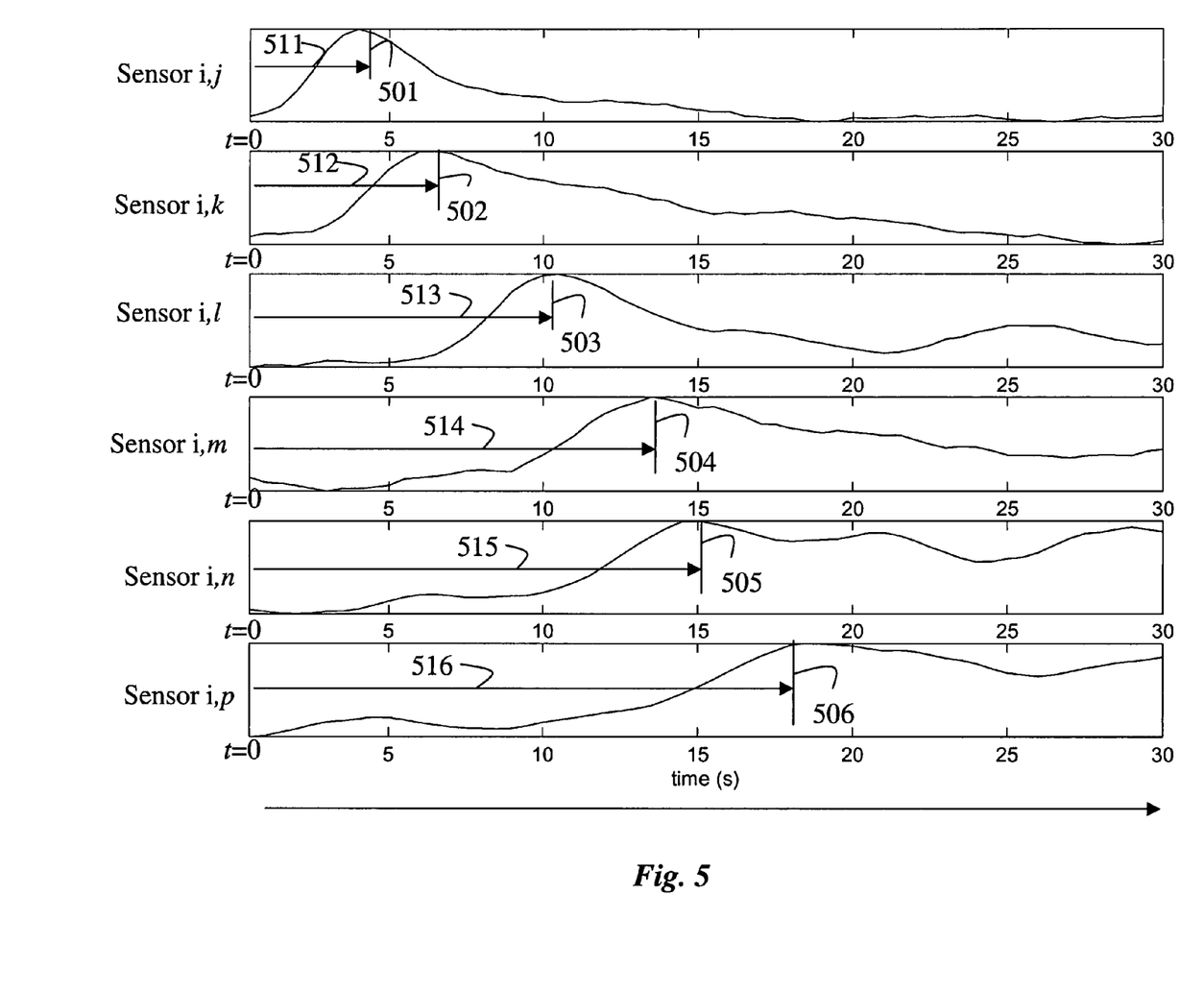
FIG. 5 illustrates determining inter sensor distances from co-occurrence matrices.

The FIG. 5 compares total events of the co-occurrence matrices of sensor i with those of sensors j to p across a range of thirty second offsets. In FIG. 5, time runs forward from left to right. The peaks 501-506 in the co-occurrence matrices reflect relative time-offsets between events detected at sensor i and each of sensors j-p. Over a long period of time, the peaks occur at average 'transit' times 511-516 it takes a significant number of the users to move from sensor i to next sensors j to p.

The transit times 511-516 are used to determine the distances d 261 between the corresponding sensors. The distances are then mapped 270 to a scaled geometry 271 of the sensors.

In a preferred embodiment, we use multi-dimensional scaling (MDS) to map the distances to the geometry, see, e.g., Steyvers, "Multidimensional Scaling," *Encyclopedia of Cognitive Science*, Macmillan Reference Ltd. 2002. Generally, MDS arranges objects, e.g., sensors, in a space with a predetermined number of dimensions, e.g., two under distance constraints.

A 'stress' measure Φ can be used to evaluate a likelihood that a particular geometry conforms to the estimated distances according to $$\Phi = \Sigma[f(d_{ij} - \delta_{ij})],$$

where f(ij) is a non-metric, monotone transformation. The stress measure is used to rank-order the distances between the sensors.

Other similar measures can also be used such as measures that use a sum of squared deviations of the distances, or some monotone transformation of those distances. Generally, the smaller the stress measure, the likelier the estimated geometry reflects accurately the actual physical geometry as observed by the sensors. By applying an estimated velocity of the users, the geometry can be scaled to real-world dimensions.

The co-occurrences matrices according to the invention as described herein are used primarily to determine the geometry of the sensor network. However, it should be noted that the co-occurrences matrices capture a number of general global, as well as local, characteristics of the user movement within an environment. Therefore, the co-occurrence matrices can be used for other useful applications.

Activity Prediction

Figure 6:
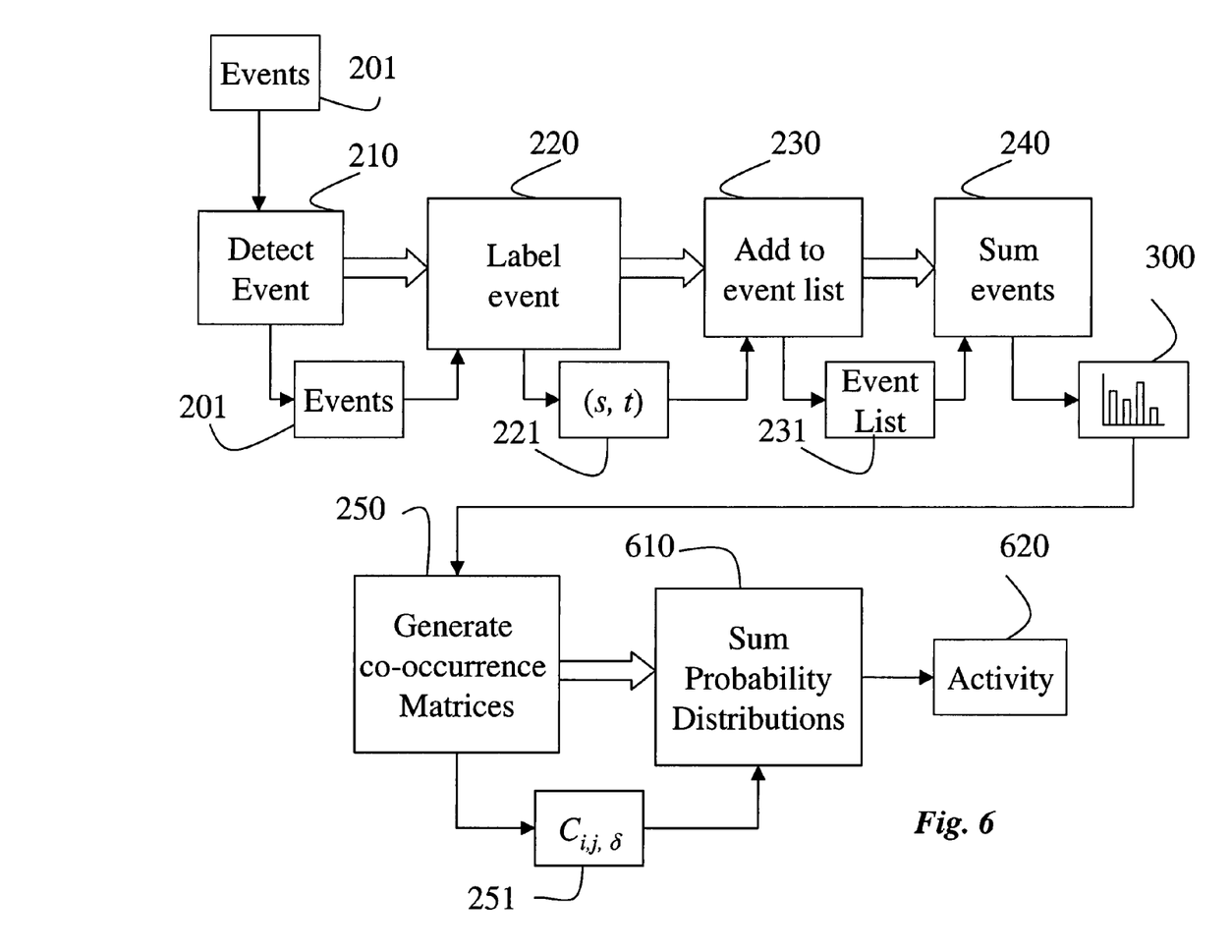
FIG. 6 is a flow diagram of the method for predicting future activities according to the invention.

As shown in FIG. 6, the co-occurrence matrices can also be used to predict future activities 620. According to the invention, the beginning of an activity is signaled by a terminating event. For example, the events detected are users moving in the hall and foyer areas of FIG. 1A. The terminating event is a hall call signaled by the user pushing an elevator button 154. The activity is scheduling an elevator car to serve the user.

The problem to be solved is to predict the scheduling activity of the elevator car prior to a user pressing the hall call button 154. If this activity can be predicted with a high level of confidence, then an elevator can be dispatched prior to the user pressing the call button. This saves time.

Given the co-occurrence matrices 251 for some period of time t<$T_0$ in the past, the problem is to predict a specific activity before the terminating event associated with the activity is detected. This problem can be restated as the probability that a particular terminating event $E_{term}$ associated with the activity A will occur at a particular time given the co-occurrence matrices 251.

One way to determine this probability is to sum 610 the probability distribution for each of the terminating event with respect to all other detected events. The co-occurrence matrices enable this by parameterizing the time-offsets between the events and the terminating event.

Figure 7:
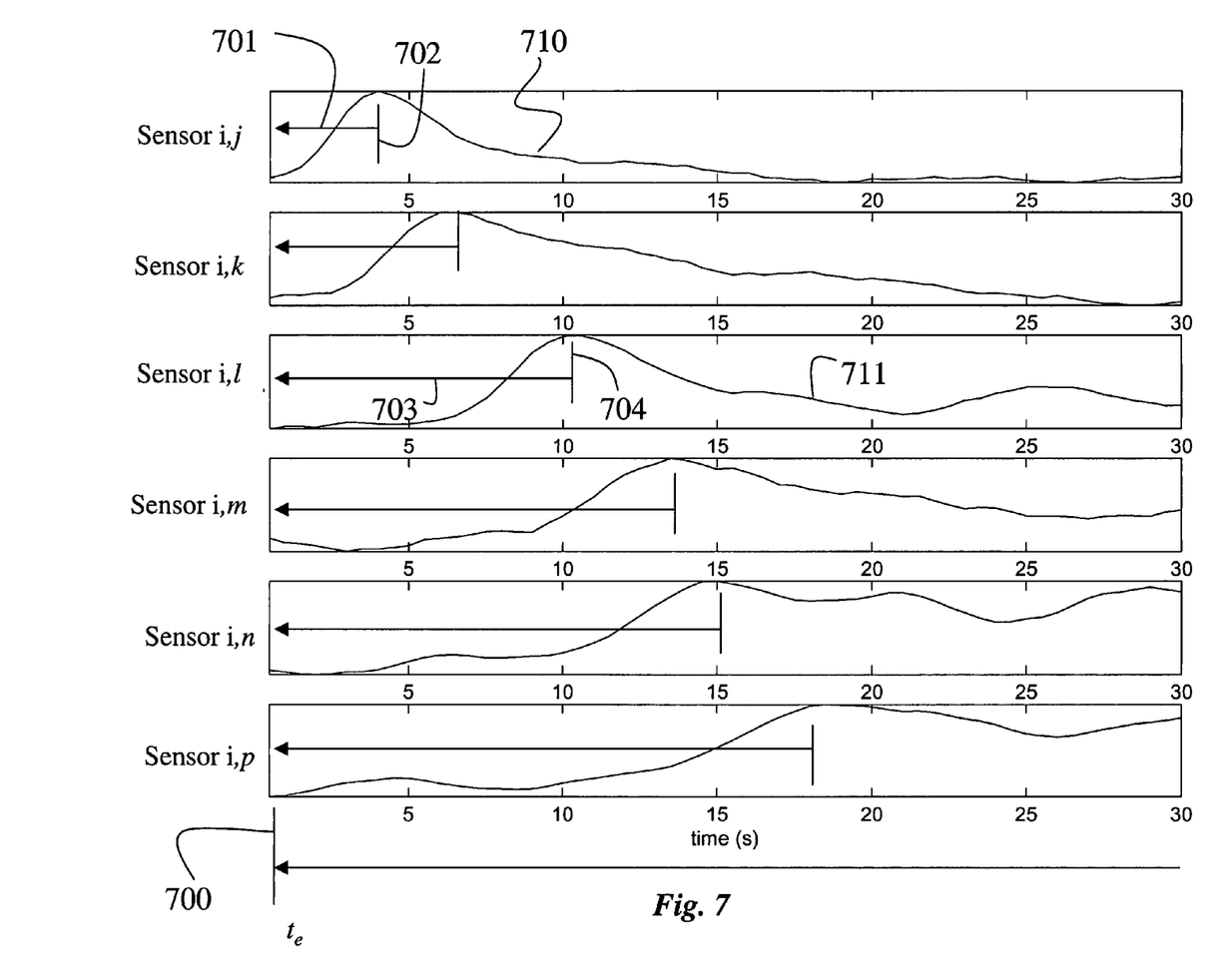
FIG. 7 compares time-offsets between detected events and a terminating event.

As shown in FIG. 7, for the purpose of activity prediction, the time-offset in the co-occurrence matrices are interpreted as probability distributions. The probability distributions are analyzed by looking backwards in time from the terminating event associated with the activity to be predicted.

In FIG. 7, the terminating event is detected by sensor i at time $t_e$ 700. The probability distribution 710 indicates the likelihood that the events detected by sensor j are followed by the terminating event for some time-offsets 701 peaking at time 702. Similarly, events detected by sensor 1 are followed by the terminating event for time-offsets 703 as indicating by the distribution 711 peaking at time 704.

Figure 8:
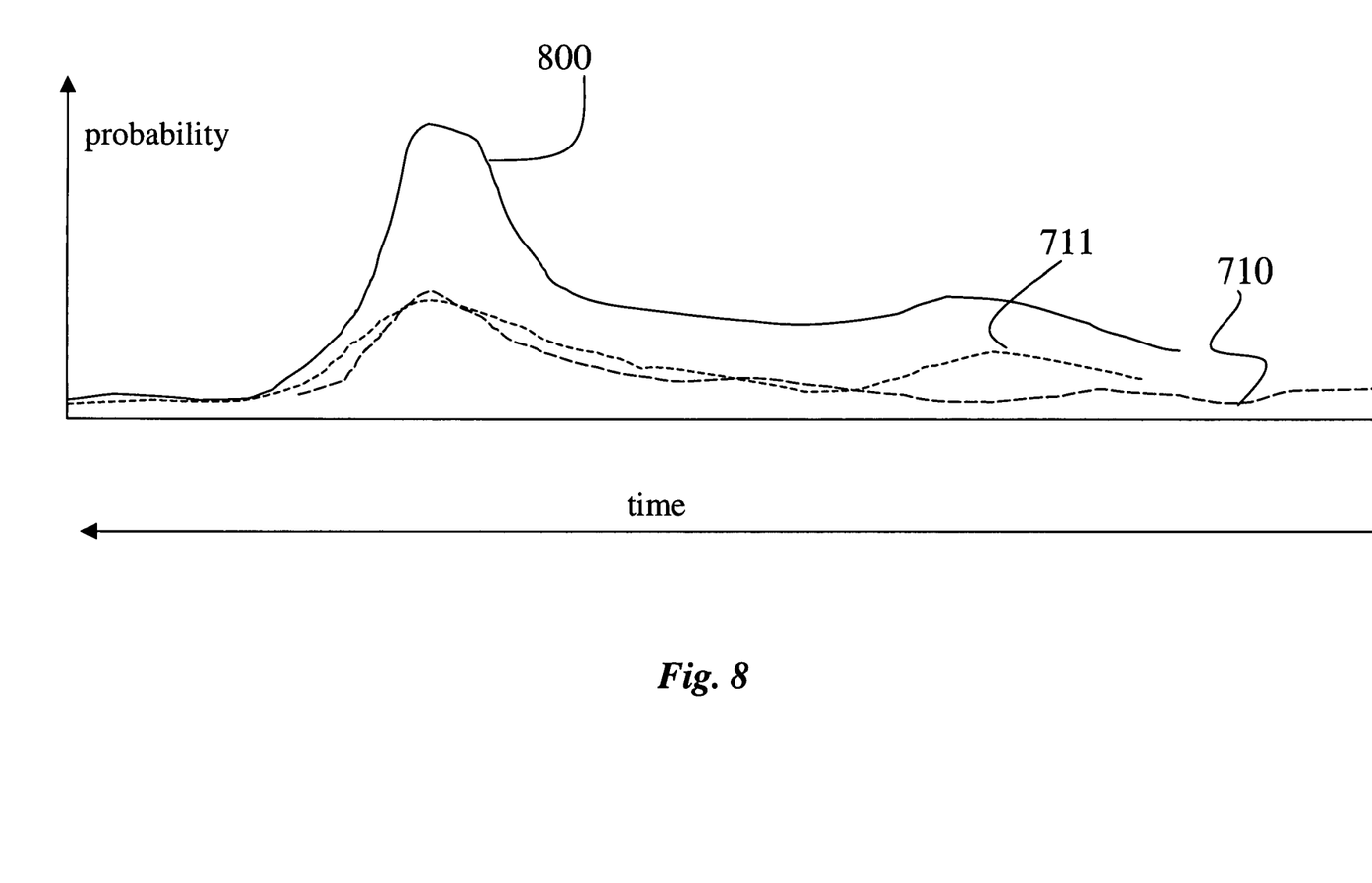
FIG. 8 illustrates summed probability distributions for predicting events.

FIG. 8 shows a normalized sum 800 of the distributions 710-711 after time alignment. Essentially, the sum 800 models the likelihood that the terminating event will occur if an event is detected at sensor j at time off-set 702 and another event is detected at sensor l at time-offset 704. This can be expressed mathematically as $$p(A_{t_e} = 1 \mid E_{t_0}, E_{t_0-1}, E_{t_0-2}, \ldots) = \sum_{\forall t} p(E_{t_e} \mid E_t).$$

By setting the $t_0 > t_e$ and comparing the probability to a threshold, the likelihood of the activity is predicted for predetermined amounts of time in to the future.

Figure 9:
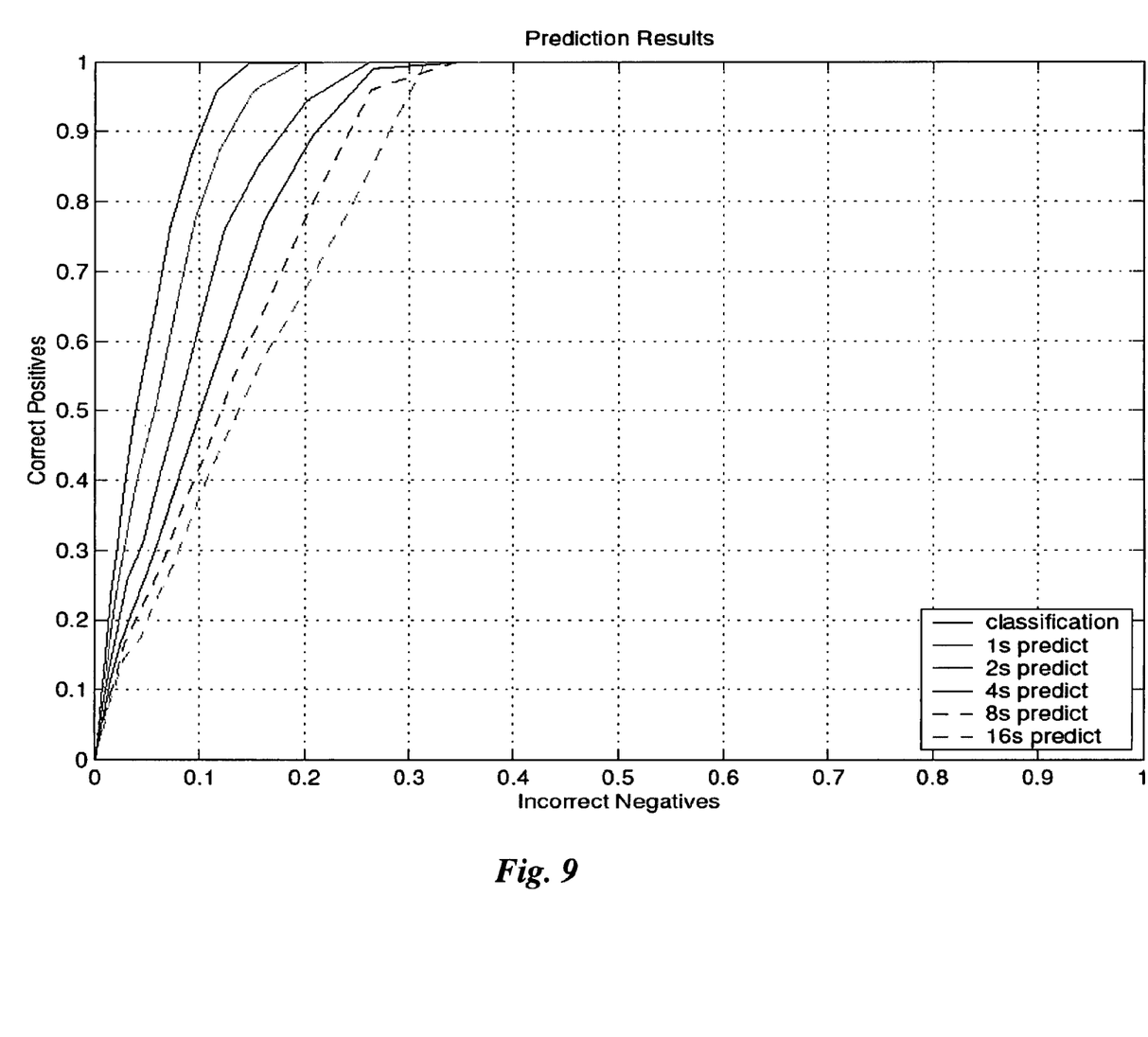
FIG. 9 is a ROC curve for results of the invention.

FIG. 9 shows the receiver operating characteristic (ROC) curve for the method for predicting an activity according to the invention for 1 to 16 second time lags.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for modeling movement of users in an environment, the environment including sensors connected in a network, comprising:

detecting events due to movement of the users at the sensors;

labeling each event according to a particular sensor that detected the event and time of the event;

summing the events for each sensor into a corresponding histogram time interval bin associated with the sensor;

generating a plurality of co-occurrence matrices from the histograms according to $$C_{i,j,\delta} = \sum_{t=0}^{T} H_{i,t} H_{j,t+\delta},$$

where i and j represent each possible pair of sensors, δ represent time off-sets, T is a total time for the detecting, t represents a particular time, and H represents the histogram time interval bins.

2. The method of claim 1, in which the environment is inside a building.

3. The method of claim 1, in which the environment is an open space.

4. The method of claim 1, in which the network is wired.

5. The method of claim 1, in which the network is wireless.

6. The method of claim 1, in which the network includes wired and wireless sensors.

7. The method of claim 1, in which the sensors have a resolution of one bit to detect the events.

8. The method of claim 1, in which a sensing modality is selected from the group consisting of infra-red, thermal, ultrasonic, light, radar, sonar, microwave, pressure, on-off switch, and combinations thereof.

9. The method of claim 1, in which the sensors are globally distributed in the environment in an ad-hoc arbitrary pattern.

10. The method of claim 1, in which ranges of some sensors are non-overlapping.

11. The method of claim 1, further comprising:
determining, for each possible pair of sensors, a distance between the pair of sensors; and
mapping the distances to a geometry of the sensors.

12. The method of claim 11, in which the summed events include peaks, and each peak reflects a relative time-offset between a particular pair of sensors.

13. The method of claim 12 in which the determining further comprises:
applying a consistent average velocity of the movement of the users over time to the relative time-offset between the pair of sensors.

14. The method of claim 11, in which the mapping uses multi-dimensional scaling.

15. The method of claim 14, further comprising:
evaluating a likelihood that a particular geometry conforms to the estimated distances using a stress measure $\Phi = \Sigma [d_{ij} - f(\delta_{ij})]$, where f(ij) is a non-metric, monotone transformation.

16. The method of claim 15, in which the stress measure rank-orders the distances between the pairs of sensors.

17. The method of claim 1, in which a particular sensor detects events associated with predicting a future activity, and further comprising:
determining, from the co-occurrence matrices, distributions of probabilities that the terminating event occurs based on the events detected by all of the other sensors other than the particular sensor; and
summing the distributions of probabilities to predict the probability that the future activity will occur prior to detecting the terminating event while detecting the events.

18. The method of claim 17, in which there is one distribution for each other sensor.

19. A system for modeling movement of users in an environment, comprising:
a plurality of sensors distributed throughout the environment;
means for labeling events detected by the sensors according to a particular sensor that detected the event and time of the event;
means for summing the events for each sensor into a corresponding histogram time interval bin associated with the sensor; and
means for generating a plurality of co-occurrence matrices from the histograms according to $$C_{i,j,\delta} = \sum_{t=0}^{T} H_{i,t} H_{j,t+\delta},$$

where i and j represent each possible pair of sensors, $\delta$ represent time off-sets, T is a total time for the detecting, t represents a particular time, and H represents the histogram time interval bins.

20. The system of claim 19, further comprising:
means for determining, for each possible pair of sensors, a distance between the pair of sensors; and
means for mapping the distances to a geometry of the sensors.

21. The system of claim 19, in which a particular sensor detects events associated with a future activity, and further comprising:
means for determining, from the co-occurrence matrices, distributions of probabilities that the terminating event occurs based on the events detected by all of the other sensors other than the particular sensor; and
means for summing the distributions of probabilities to predict the probability that the future activity will occur prior to detecting the terminating event while detecting the events.

* * * * *